E. MOSHER.
Seed-Drills.
No. 154,511.
Patented Aug. 25, 1874.
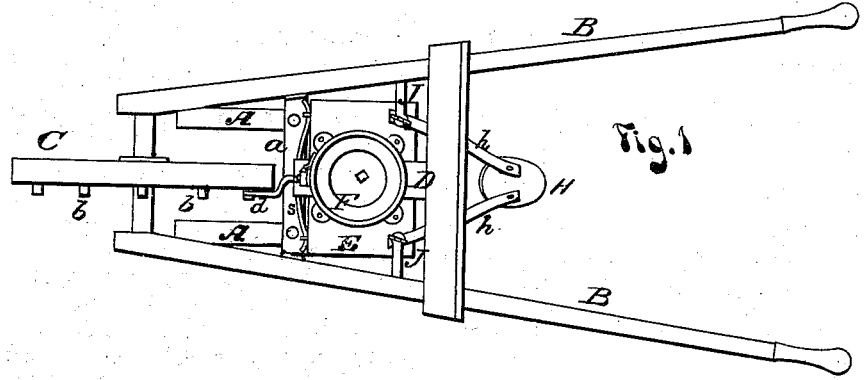
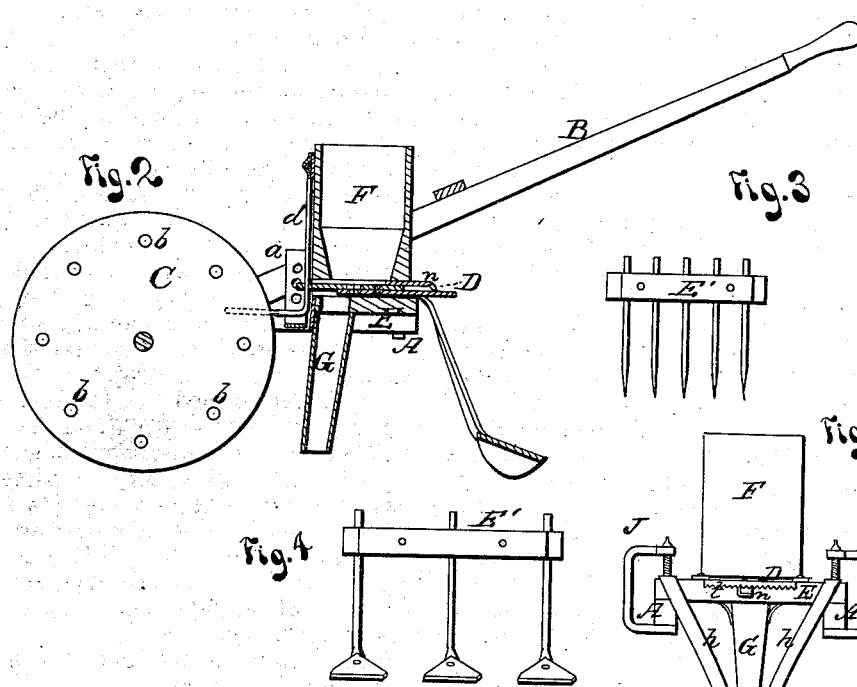
Witnesses.
Robert Everett,
George E. Upham.
Inventor.
Eli Mosher,
Chipman Hosmer & Co
Attys.

UNITED STATES PATENT OFFICE.

ELI MOSHER, OF HOLLY, MICHIGAN.

IMPROVEMENT IN SEED-DRILLS.

Specification forming part of Letters Patent No. 154,511, dated August 25, 1874; application filed April 4, 1874.

*To all whom it may concern:*

Be it known that I, ELI MOSHER, of Holly, in the county of Oakland and State of Michigan, have invented a new and valuable Improvement in Seed-Drills, &c.; and I do hereby declare that the following is a full, clear, and exact description of the construction and operation of the same, reference being had to the annexed drawings making a part of this specification, and to the letters and figures of reference marked thereon.

Figure 1 of the drawing is a representation of a plan view of my seed-drill, and Fig. 2 is a sectional view of the same. Figs. 3, 4, 5, and 6 are detail views.

This invention has relation to seed-drills with cultivator and harrow attachments. It consists in the construction of a seed-slide and a gage-lever, as hereinafter described and claimed.

In the annexed drawings, A A designate two longitudinal beams, which are pivoted at their front ends to two handles, B B, and again connected to these handles by means of a brace, $a$, which will allow the handles to be adjusted and fixed at different angles with respect to the beams A, for the purpose of regulating the depth of sowing. In front of the pivotal attachments of the beams A is a transporting-wheel, C, in one face of which studs $b$ are adjustably applied for reciprocating a seed-slide, D. The studs are endwise adjustable, so that they can be moved out of the way of an arm, which they successively strike when brought in the range thereof. I am thus able to adjust any desired number of the studs out of the range of said arm, and thereby cause the seed to drop at different distances in the rows. E designates a cross-bar, on which is secured a hopper, F, and on which plays longitudinally the seed-slide D, for discharging the seed in desired quantities through a seed-tube, G. The bar E is rigidly but removably secured upon the rear ends of the beams A by means of clamps J J, which, respectively, consist of a rectangular clasp and a clamping-screw, as shown in Fig. 6. By loosening the screws of the clamps J, they can be removed from the beams A A, together with the cross-bar E and its attachments.

When this is done, either a harrow (shown by Fig. 3) or a cultivator (shown by Fig. 4) can be secured upon the beams A by means of the said clamps J. The heads or cross-bars E' of the harrow and cultivator teeth are longitudinally divided, and receive between their bars the shanks of the teeth, which are confined in place by means of bolts passed transversely through these bars. By loosening the bolts, the said teeth can be adjusted and set in different positions. H designates a coverer for turning the earth over the seed, which coverer is secured to the rear ends of yielding arms $h\ h$, secured to the cross-bar E, and pressed upon by the screws of clamps J. The seed-slide D has a square hole, $o$, through it, and a gage-lever, $n$, pivoted underneath of it. One end of the gage-lever $n$ has a rectangular notch, $o'$, formed on it, as shown in Fig. 5, so that by adjusting this lever the passage $o$ for the seed can be reduced in size without materially changing the shape of this passage. The rear arm of the gage-lever has a pawl-flange formed on its edge, which will engage with teeth $t$, formed on the rear end of the slide D, and thus hold the gage-lever at any point to which it may be adjusted. The seed-slide D is reciprocated by the pins $b$ striking the front end of a bent arm, $d$, which arm is pivoted to the hopper F, passed through the front end of the said slide, and behind a spring, $s$, which latter returns the slide after it is struck by the pins $b$.

What I claim as new, and desire to secure by Letters Patent, is—

The seed slide D, having the square opening $o$, combined with the gage-lever $n$, pivoted to the under side of the slide D, and provided with the rectangular notch $o'$ at its forward end, and a pawl-flange formed on its rear end, to engage with teeth $t$, formed on the rear end of the slide D, as and for the purpose mentioned.

In testimony that I claim the above I have hereunto subscribed my name in the presence of two witnesses.

ELI MOSHER.

Witnesses:
M. B. GILBERT, Jr.,
W. A. TAYLOR.